United States Patent
Kim

(10) Patent No.: US 7,283,357 B2
(45) Date of Patent: Oct. 16, 2007

(54) ANTITHEFT DEVICE FOR PORT REPLICATOR

(75) Inventor: Phil-Sang Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 153 days.

(21) Appl. No.: 11/135,383

(22) Filed: May 24, 2005

(65) Prior Publication Data

US 2005/0286218 A1   Dec. 29, 2005

(30) Foreign Application Priority Data

Jun. 28, 2004  (KR) ............... 10-2004-0049056

(51) Int. Cl.
   *G01F 1/16*   (2006.01)
(52) U.S. Cl. ............... 361/686; 361/683; 248/552; 70/58
(58) Field of Classification Search ............... 361/683, 361/679, 686, 724–727; 248/552, 553; 312/223.1, 312/223.2; 70/14, 57, 58, 32–34; 395/186, 395/188.01, 43.12–43.22; 710/303, 304
   See application file for complete search history.

(56) References Cited

U.S. PATENT DOCUMENTS

| | | | |
|---|---|---|---|
| 5,692,400 A * | 12/1997 | Bliven et al. ............... | 70/58 |
| 5,987,937 A | 11/1999 | Lee et al. | |
| 5,995,366 A * | 11/1999 | Howell et al. ............... | 361/686 |
| 6,275,378 B1 * | 8/2001 | Lee et al. ............... | 361/686 |
| 6,331,934 B1 * | 12/2001 | Helot et al. ............... | 361/686 |
| 6,522,533 B1 * | 2/2003 | Ikeuchi et al. ............... | 361/686 |
| 6,560,103 B1 | 5/2003 | Dohi et al. | |
| 6,570,758 B1 * | 5/2003 | Maeda ............... | 361/686 |
| 6,724,623 B2 | 4/2004 | Bovio et al. | |
| 6,757,166 B2 * | 6/2004 | DeLuga et al. ............... | 361/686 |
| 6,934,151 B2 * | 8/2005 | Nakano et al. ............... | 361/686 |
| 2003/0128506 A1 | 7/2003 | Won et al. | |
| 2003/0202323 A1 | 10/2003 | Maeda | |
| 2003/0227744 A1 | 12/2003 | DeLuga et al. | |

FOREIGN PATENT DOCUMENTS

| | | |
|---|---|---|
| CA | 2404544 | 3/2004 |
| CN | 2387576 Y | 7/2000 |
| CN | 1453682 A | 11/2003 |
| KR | 2002-0000359 A | 1/2002 |
| TW | 585286 U | 4/2004 |

\* cited by examiner

*Primary Examiner*—Michael Datskovskiy
(74) *Attorney, Agent, or Firm*—Birch, Stewart, Kolasch & Birch, LLP

(57) ABSTRACT

An antitheft device for a port replicator includes a case with a plurality of ports and at least two locking holes. A locking mechanism is locked into one of the locking holes. An actuating lever is provided at one side of the case and receives an actuating force to separate a portable computer from the port replicator. A link mechanism is driven by the actuating lever. A locking plate prevents the actuating lever from being operated when the locking mechanism is locked into one of the locking holes. Therefore, the port replicator and portable computer can be prevented from being stolen by having the portable computer and port replicator locked with each.

18 Claims, 9 Drawing Sheets

ANTITHEFT DEVICE FOR PORT REPLICATOR

This application claims the priority benefit of Patent Application No. 10-2004-0049056 filed on Jun. 28, 2004 in Republic of Korea, which is hereby incorporated by reference.

BACKGROUND OF THE INVENTION

1. Field of the Invention

The present invention relates to a port replicator that is mounted to a portable computer such that the portable computer and its peripheral devices can be more easily connected with each other. More particularly, the present invention relates to an antitheft device which secures both the portable computer and port replicator.

2. Description of the Prior Art

A port replicator is used to expand the function of a portable computer, such as a notebook computer, and includes a variety of connection ports. Such a port replicator allows a portable computer to be separated, carried or used in a state where it is disconnected from the peripheral devices connected to the connection ports of the port replicator.

FIG. 1 shows the configuration of a portable computer and port replicator. Referring to this figure, the portable computer 1 is mainly divided into a main body 3 and a display unit 7, which is mounted at an end of the main body 3.

The main body 3 is shaped as a flat rectangular plate and includes a variety of parts and substrates installed therein. An input device such as a keyboard 4 is provided on a top surface of the main body 3. The display unit 7 is mounted to a rear end of the main body 3 by means of a hinge unit 5 in such a manner that its angle can be adjusted relative to the main body 3. The display unit 7 is provided with a liquid crystal display 8 on which an image signal is displayed.

A port replicator 10 is generally configured such that a rear bottom surface of the main body 3 is mounted onto the port replicator 10. A front top surface of the port replicator 10, i.e. a portion on which the rear bottom surface of the main body 3 is securely seated, includes an inclined supporting surface 11. A connector 12 for connection with the main body 3 is provided on the inclined supporting surface 11. The connector 12 is connected with a corresponding connector (not shown) formed on the rear bottom surface of the main body 3, such that electrical connection between the main body 3 and the port replicator 10 can be made.

Catching hooks 13 and 13' are provided on the inclined supporting surface 11. The catching hooks 13 and 13' serve to fasten the main body 3 to the port replicator 10. A separation button 14 is provided on a portion of the top surface of the port replicator 10. The separation button 14 causes the catching hooks 13 and 13' to be unfastened from the main body 3. Reference numeral 15 denotes a power button. The portable computer 1, when mounted to the port replicator 10, can be turned on/off by means of the power button 15.

As illustrated in FIG. 1b, a variety of ports such as LAN port(s), modem port(s), external monitor port(s), parallel port(s), serial port(s), keyboard port(s), mouse port(s), USB port(s) and card slot(s) into which PCMCIA card(s) are inserted are provided on a rear surface of the port replicator 10.

A locking hole 16 is formed on the rear surface of the port replicator 10 on which the various ports are provided. A locking mechanism 17 for preventing the port replicator 10 from being stolen is fastened into the locking hole 16. Such a locking mechanism 17 has been available in the related art, and sold under the trademark "Kensington lock." The locking mechanism 17 prevents the port replicator 10 from being stolen by having one end thereof fixed to a fixed structure (such as a desk) and a locking protrusion of a locking body 18, provided on a tip end thereof, inserted into and fastened to the locking hole 16.

However, the aforementioned related art has the following drawbacks.

When the portable computer 1 is used in a state where it is mounted to the port replicator 10, the port replicator 10 is generally locked using the locking mechanism 17. However, since the portable computer 1 can be readily separated from the port replicator 10, merely by pushing down the separation button 14, it is easy for the portable computer 1 to be stolen.

To prevent the portable computer 1 from being stolen, the portable computer 1 should also be locked to a fixed structure (such as a desk) using another locking mechanism 17. This is inconvenient. Two locking cables will clutter the work area of the desk. Further, it takes time to lock and unlock two locking mechanisms 17.

SUMMARY OF THE INVENTION

Accordingly, the present invention is conceived to solve one or more of the aforementioned drawbacks in the prior art. An object of the present invention is to provide an antitheft device for a port replicator capable of simultaneously locking a port replicator and a portable computer with each other using a single locking mechanism.

Another object of the present invention is to provide an antitheft device for a port replicator capable of locking a port replicator and a portable computer with each other in various manners using a single locking mechanism.

According to an aspect of the present invention for achieving the objects, there is provided an antitheft device for a port replicator, comprising a case that defines an external appearance of the port replicator and includes a plurality of ports and at least one locking hole in which a locking mechanism is locked. The locking hole may be formed at one side of the case. An actuating lever is provided at one side of the case to receive an actuating force. A locking plate, which accepts the locking mechanism inserted and locked in the locking hole, prevents the actuating lever from being operated.

Preferably, the case is provided with first and second locking holes into which the locking mechanism can be inserted. The locking plate is moved when the locking mechanism is locked in one of the locking holes.

The actuating force may be transmitted through the link mechanism to a driving plate for driving a push protrusion and catching hooks to fasten and separate the portable computer relative to the port replicator.

The link mechanism may be provided with a locking piece at a side thereof The locking plate may be provided with a hook piece that is selectively positioned on a locus, where the locking piece is moved and prevents the link mechanism from being operated.

Preferably, the locking plate is provided with a driving piece at a tip end thereof, and the driving piece corresponds to the locking hole and tends to move toward the reinforcing piece by means of an elastic member.

According to another aspect of the present invention, there is provided an antitheft device for a port replicator, comprising a case that defines an external appearance of the port replicator and includes a plurality of ports and at least two locking holes, in which a locking mechanism is locked. The at least two locking holes are formed at one side of the case. An actuating lever is provided at one side of the case to receive an actuating force needed to separate a portable computer from the port replicator. A link mechanism is driven by receiving the actuating force from the actuating lever. A locking plate, which causes the locking mechanism to be inserted and locked in one of the locking holes, prevents the actuating lever from being operated.

The actuating lever may be installed to be rotatable about a lever hinge of which both ends are supported on a lever base made of a metal material. The lever base may include first and second plates formed in parallel with each other and a connection plate connected perpendicular to the first and second plates.

The locking plate may be movably installed on the lever base and include a hook piece, which is selectively hooked in the link mechanism, and a driving piece, which extends beyond the lever base to a position corresponding to one of the locking holes, and is urged by the locking mechanism.

Preferably, the link mechanism includes a locking piece, which is selectively hooked in the hook piece of the locking plate, to regulate the operation of the actuating lever.

Preferably, the link mechanism comprises first and second links. The second link has the locking piece formed thereon and may be formed with a stepped portion for preventing interference with the lever base with the locking plate installed thereon.

Preferably, a reinforcing piece is further provided on an inner surface of the case with the locking hole formed thereon. The reinforcing piece is formed with a through-hole corresponding to the locking hole.

According to the present invention configured as above, the portable computer and port replicator can be locked with each other in various manners using the antitheft device for the port replicator of the present invention. Thus, there is an advantage in that the port replicator and portable computer can be prevented from being stolen.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The above and other objects, features and advantages of the present invention will be more clearly understood from the following detailed description taken in conjunction with the accompanying drawings, in which:

FIG. 2b is a rear perspective view of the port replicator of FIG. 2a;

DETAILED DESCRIPTION OF THE PREFERRED EMBODIMENTS

This application incorporates by reference an application entitled "A PORT REPLICATOR" filed on even data herewith and commonly assigned.

Hereinafter, a preferred embodiment of an antitheft device for a port replicator according to the present invention will be described in detail with reference to the accompanying drawings.

Figure 1A:
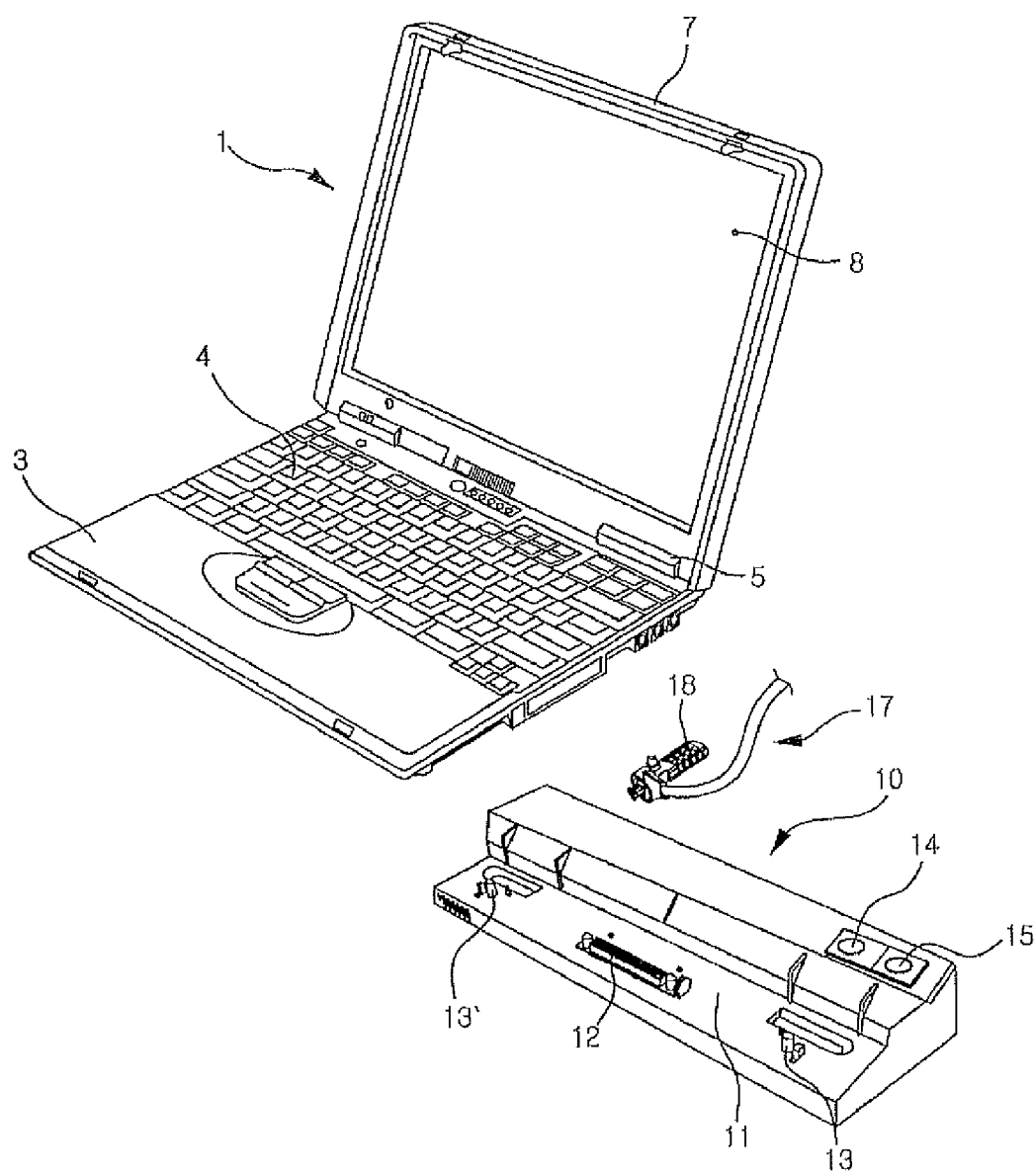
FIG. 1a is a perspective view showing the configuration of a portable computer and port replicator, according to the related art.
Figure 1B:
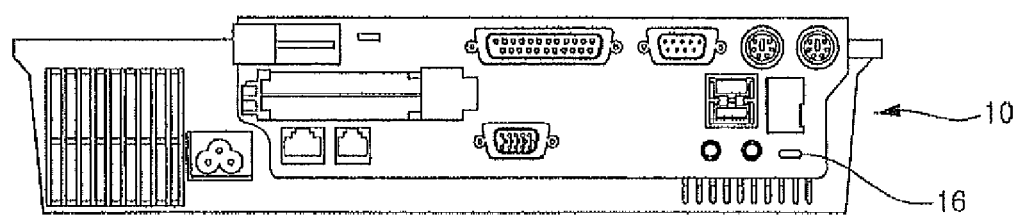
FIG. 1b is a rear view showing the rear configuration of the related art port replicator.
Figure 2A:
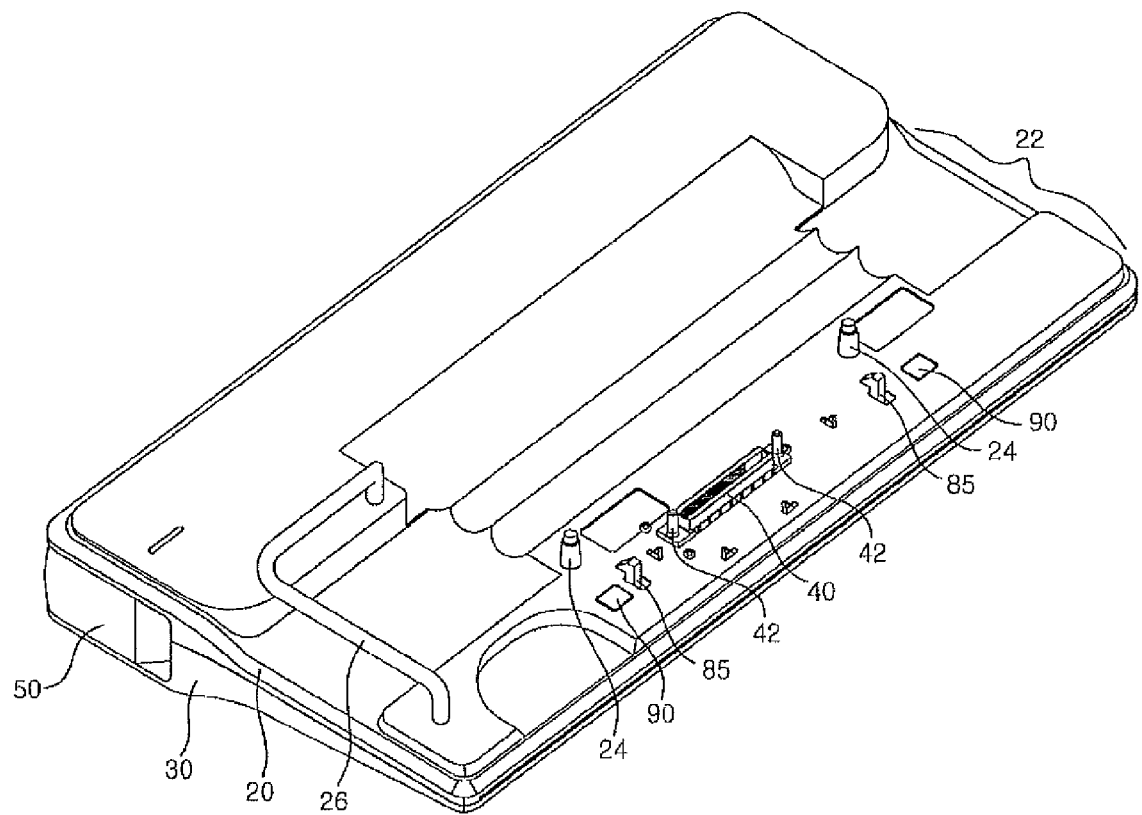
FIG. 2a is a front perspective view of a port replicator with an antitheft device, according to the present invention.
Figure 2B:
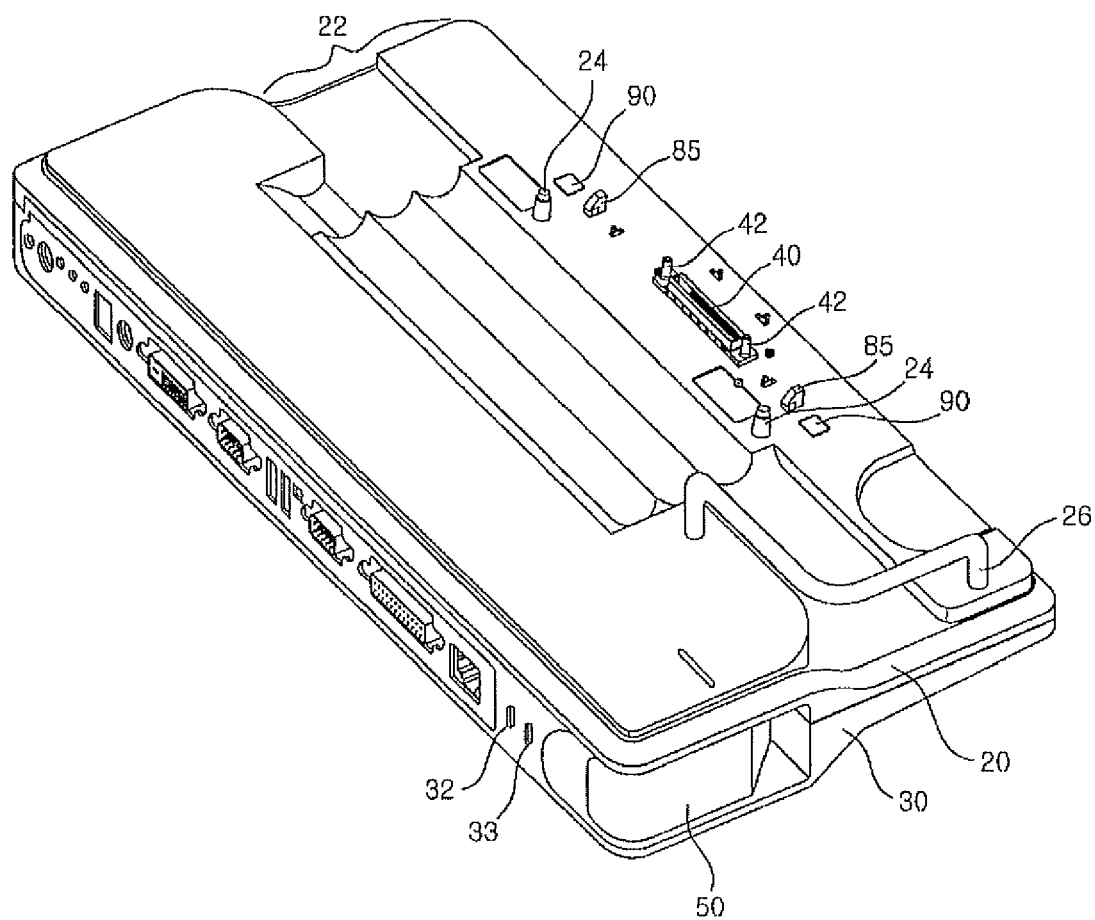
Figure 3:
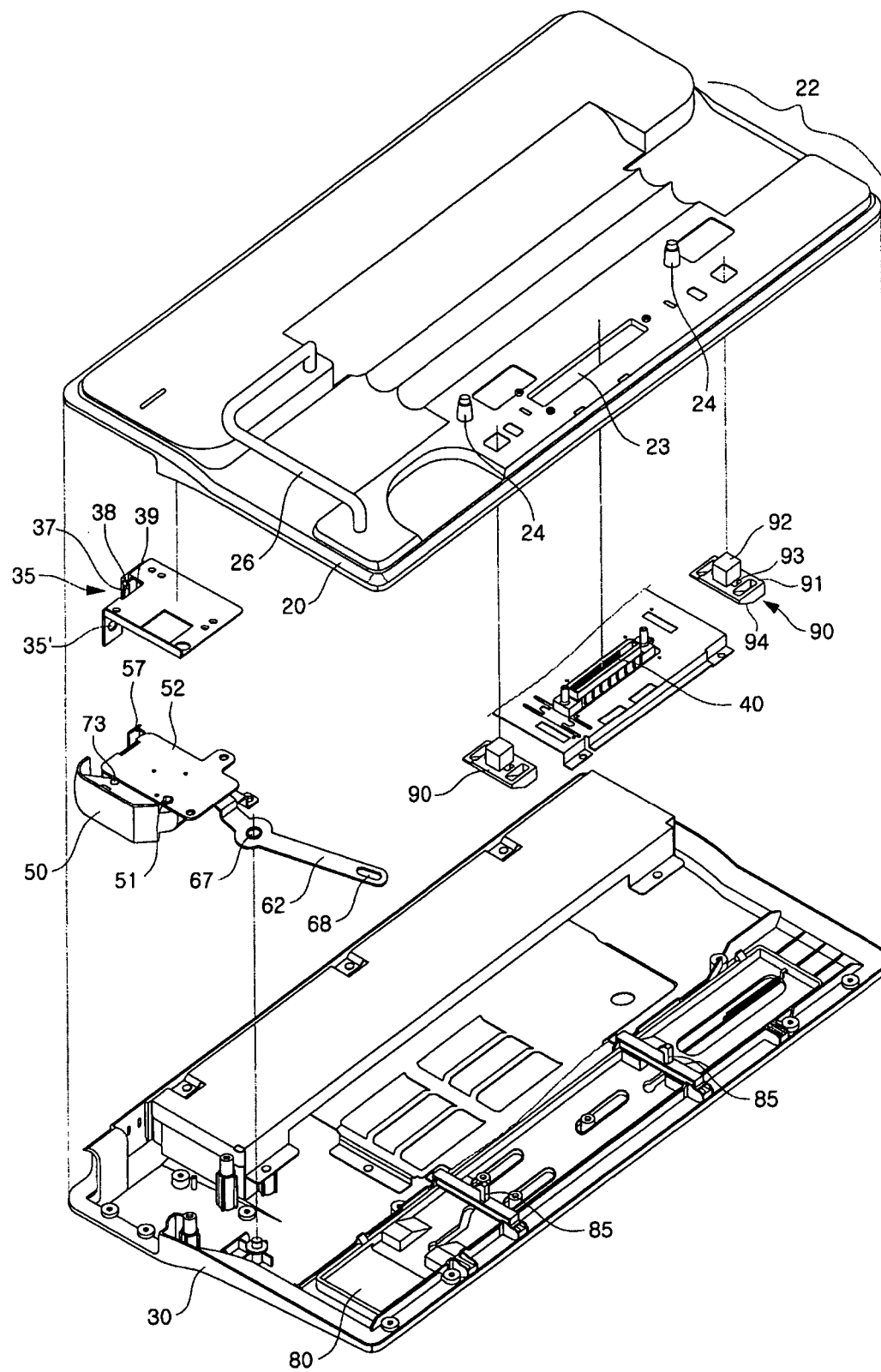
FIG. 3 is an exploded perspective view of the port replicator of FIG. 2.
Figure 4:
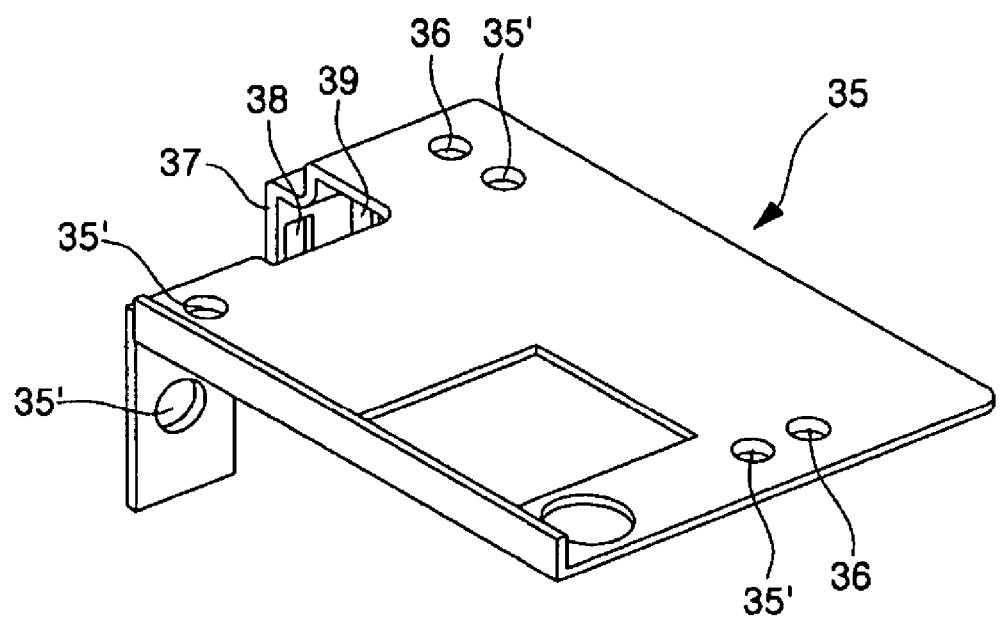
FIG. 4 is a perspective view showing the configuration of a reinforcing plate of the port replicator, according to the present invention.

FIGS. 2a and 2b are perspective views showing a configuration of a port replicator with an antitheft device, according to the present invention. FIG. 3 is an exploded perspective view showing the configuration of FIG. 2. FIG. 4 is a perspective view showing a reinforcing plate of the preferred embodiment of the present invention.

Referring to these figures, the port replicator of the present invention is divided into an upper case 20 and a lower case 30 that define an external appearance of the port replicator. The upper and lower cases 20 and 30 are generally shaped as flat plates and combined together to define a predetermined space therebetween. An inclined supporting surface 22 is formed on a top surface of the upper case 20 over a predetermined width from a front end thereof A rear bottom surface of a portable computer is securely seated on the inclined supporting surface 22. Thus, the portable computer is installed to the port replicator in such a manner that its front end is relatively lower than its rear end.

A rectangular connector hole 23 is perforated through the top surface of the upper case 20 in the inclined supporting surface 22. A connector 40, to be explained later, is exposed to the top of the upper case 20 through the connector hole 23. Two guide bosses 24 are formed at both sides of the connector hole 23 to be spaced apart from the connector hole 23 by a predetermined distance. The guide bosses 24 are integrally formed on the top surface of the upper case 20. A guide rod 26 is provided on a portion of the upper case 20. The guide rod 26 is generally 'L' shaped and located at an edge corresponding to a corner of the inclined supporting surface 22. The guide rod 26 serves to cover a portion in the vicinity of a corner where the side and rear surfaces of the portable computer mounted onto the port replicator intersect with each other.

The lower case 30 defines an external appearance of bottom and rear surfaces of the port replicator. As shown in FIG. 2b, a plurality of ports or jacks are exposed from the rear surface of the lower case 30. For the simplicity of explanation, detailed descriptions on the ports or jacks are omitted herein. First and second locking holes 32 and 33 are provided on a portion of the rear surface of the lower case 30. The first and second locking holes 32 and 33 are used to fasten the port replicator using a locking mechanism 95, such as locks sold under the trademark "Kensington lock." The locking mechanism 95 allows the port replicator to be fixed to other fixed structures (such as a desk). A locking protrusion 97 of the locking mechanism 95 is inserted into one of the locking holes 32 and 33. See for example FIG. 6b.

Since the lower case 30 on which the first and second locking holes 32 and 33 are formed is generally molded, a reinforcing plate 35 is provided in the upper and lower cases 20 and 30 to prevent the locking holes 32 and 33 from being broken. The reinforcing plate 35 is formed by bending a metal plate. A plurality of fastening holes 35' are provided in the reinforcing plate 35 and are used to allow the reinforcing plate 35 to be fastened to the upper and lower cases 20 and 30. Guide holes 36 for guiding an installation position of the reinforcing plate 35 are formed at positions adjacent to the fastening holes 35'. See FIG. 4. For example, guide bosses (not shown) formed on the bottom surface of the upper case 20 may be inserted into the guide holes 36 to guide the installation position of the reinforcing plate.

The reinforcing plate 35 is provided with a reinforcing piece 37 at one side thereof The reinforcing piece 37 is installed at a position corresponding to a position on the rear surface of the lower case 30 on which the locking holes 32 and 33 are formed. First and second through-holes 38 and 39 are formed, respectively, at positions corresponding to the first and second locking holes 32 and 33. The reinforcing plate 35, configured in such a manner, is fastened and mounted to the bottom surface of the upper case 20 and the rear surface of the lower case 30.

A circuit board (not shown) on which the ports and jacks are installed is provided within the lower case 30. At one side of the circuit board is provided the connector 40, which is exposed to the outside through the connector hole 23 of the upper case 20. The connector 40 serves to electrically connect the port replicator and portable computer.

Guide bosses 42 are integrally formed on both ends of a housing of the connector 40. The guide bosses 42 serve to allow the portable computer to be easily mounted to the port replicator in the same manner as the guide bosses 24 formed on the upper case 20.

An actuating lever 50 is provided on a side of the external surface of the port replicator in a pocket formed by combining the upper and lower cases 20 and 30. The actuating lever 50 is hand operated by a user to separate the portable computer from the port replicator. The actuating lever 50 is installed on a lever base 52 provided within the combined upper and lower cases 20 and 30. Although a lever is illustrated on the side of the case, other configurations are possible, such as a push button, also the lever or button could be located on a top side of the case.

Figure 5:
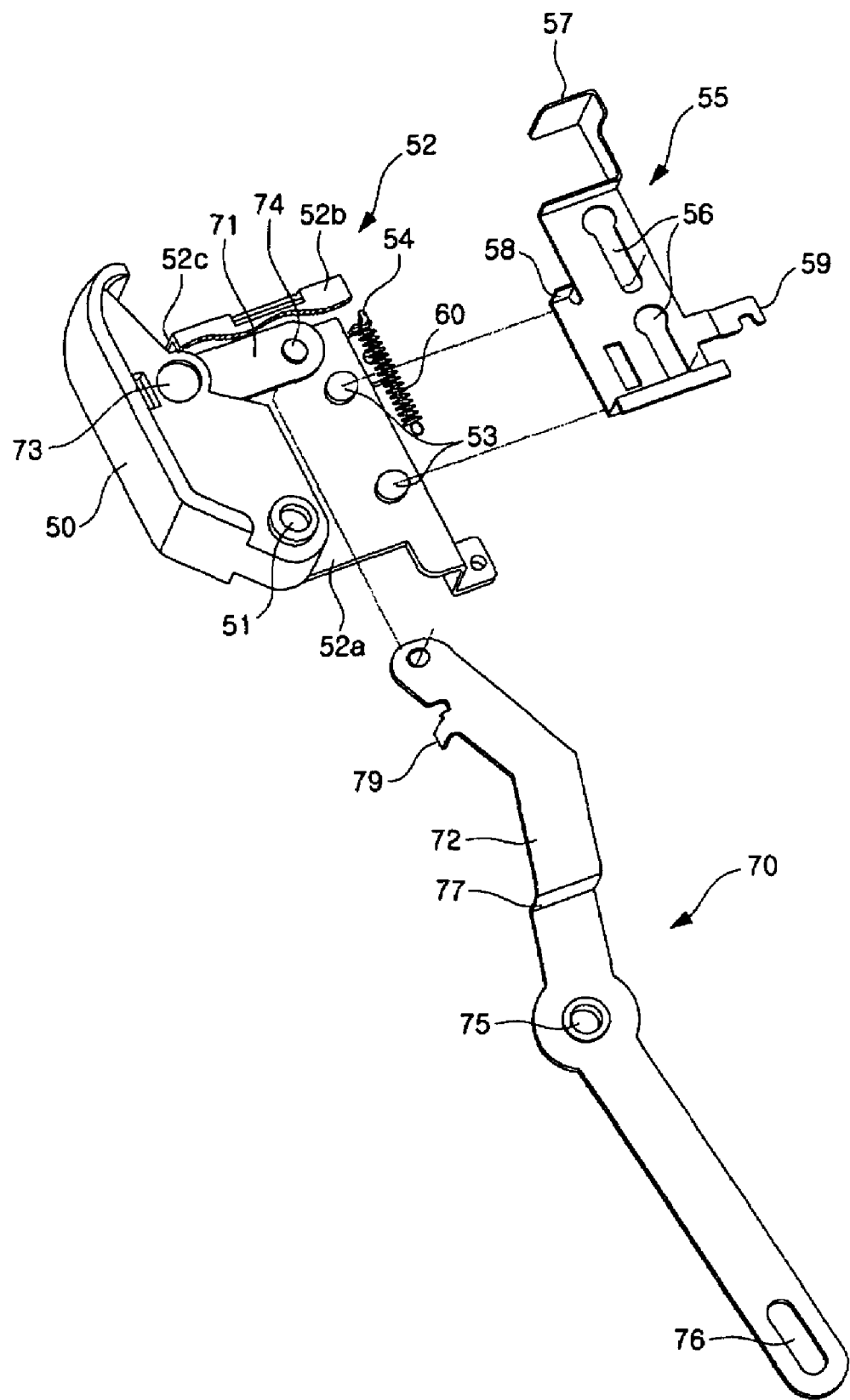
FIG. 5 is a partially cut-away exploded perspective view of moving structures of the present invention.

The lever base 52 is made of a metal material and includes a first plate 52a in the form of a plate having a predetermined area and shape, a second plate 52b parallel with the first plate 52a, and a connection plate 52c which is connected perpendicular to the first and second plates 52a and 52b, as well shown in FIG. 5. The actuating lever 50 is formed in such a manner that a tip end thereof is rotated about a lever hinge 51, of which both ends are rotatably supported on the first and second plates 52a and 52b.

Guide bosses 53 are formed on the first plate 52a of the lever base 52. The guide bosses 53 serve to guide the movement of a locking plate 55 to be explained later. The guide bosses 53 are formed in such a manner that an upper portion thereof is larger than the other portions thereof in view of its diameter. At a side of the first plate 52a of the lever base 52 is formed a connection hook 54, to which an end of an elastic member 60, to be explained later, is connected.

The locking plate 55 is installed at the lever base 52. As well shown in FIG. 5, the locking plate 55 is generally configured by bending a metal plate. The locking plate 55 is provided with at least two guide slots 56. The guide bosses 53 are placed in the guide slots 56, respectively, to guide the movement of the locking plate 55. An end of each of the guide slots 56 is formed larger than the diameter of the upper end of the guide boss 53 such that each guide boss 53 can be easily inserted into a respective one of the guide slots 56. The width of most other portions of the guide slot 56 is smaller than the diameter of the upper end of the guide boss 53.

A driving piece 57 is formed on the locking plate 55 by bending a tip end of the locking plate 55. The driving piece 57 is configured such that interference with the connection plate 52c can be prevented. The driving piece 57 is formed such that an extension of a surface facing the rear surface of the lower case 30 (i.e., a surface facing the reinforcing piece 37) is perpendicular to an extension of a top surface of the locking plate 55. The driving piece 57 is designed to have such shape and area that only the second locking hole 33 can be covered.

A hook piece 58 is formed at a portion of the locking plate 55. The hook piece 58 serves to selectively prevent the operation of a link mechanism 70 (externally, the operation of the actuating lever 50) to be explained later. The hook piece 58 protrudes from the lock plate 55 in a direction from a top surface of the first plate 52a to a bottom surface of the second plate 52b.

A connection hook 59 is also provided on the locking plate 55. The connection hook 59 is a part where an end of the elastic member 60, of which the other end is hooked to the connection hook 54 of the lever base 52, is hooked.

The locking plate 55, is securely seated on the top surface of the first plate 52a of the lever base 52 except for the driving piece 57. Therefore, the connection hooks 54 and 59 face each other and are connected to both ends of the elastic member 60, respectively. The elastic member 60 allows the driving piece 57 of the locking plate 55 to always move toward the reinforcing piece 37.

A link mechanism 70 is connected to the actuating lever 50. In this embodiment, the link mechanism 70 includes first and second links 71 and 72. The link mechanism 70 serves to transmit a driving force of the actuating lever 50 to a driving plate 80 to be explained later.

The first link 71 is pivotably connected to the actuating lever 50 through a lever connection pin 73. The first link 71 is also pivotably connected to the second link 72 through a link connection pin 74.

The second link 72 is configured such that an end thereof is connected to the first link 71 and the other end is connected to the driving plate 80. The second link 72 is installed on the lower case 30 by means of a hinge pin 75 such that it moves in a seesaw motion. A link hole 76 is formed in a portion where the second link 72 and the driving plate 80 are connected with each other. A connection pin (not shown), provided in the driving plate 80, is placed in the link hole 76.

A stepped portion 77 is formed at a portion of the second link 72. The stepped portion 77 allows an end of the second link 72, i.e. a locking piece 79, to be explained later, to be placed and operated between the first and second plates 52a and 52b without interfering with the lever base 52.

The locking piece 79 is formed on a portion of the second link 72. The locking piece 79 is provided at a side of the second link 72 with the stepped portion 77 formed thereon, and extends downward by a length equal to a height raised by the stepped portion 77. The locking piece 79 serves to prevent the link mechanism 70 from being operated when the locking piece 79 is hooked in the hook piece 58 of the locking plate 55.

As illustrated in FIG. 3, the driving plate 80 is placed in a space between the upper and lower cases 20 and 30, and more specifically, in the interior of the inclined supporting surface 22 of the upper case 20. The driving plate 80 receives the driving force of the actuating lever 50 through the link mechanism 70 and performs a linear motion. The driving plate 80 causes catching hooks 85 and push protrusions 90, which protrude beyond the incline guide surface 22 of the upper case 20, to be driven. The catching hooks 85 are fastened to the portable computer when the portable computer has been mounted to the port replicator. The push protrusions 90 serve to push up the portable computer when intending to separate the portable computer from the port replicator.

Hereinafter, the operation of the antitheft device of the port replicator according to the present invention so configured will be described in detail.

In the present invention, the locking mechanism 95 allows only the port replicator to be locked, or the port replicator and portable computer mounted thereto to be simultaneously locked. If the locking protrusion 97 of the locking mechanism 95 is inserted into the first locking hole 32, only the port replicator is locked. This is because the locking protrusion 97 is simply hooked in the first locking hole 32 so that it cannot be removed. If the locking protrusion 97 is inserted into the second locking hole 33 when the portable computer is mounted to the port replicator, the operation of the actuating lever 50 (i.e., the link mechanism 70) is not permitted. Therefore, both the port replicator and portable computer can be locked.

Figure 6A:
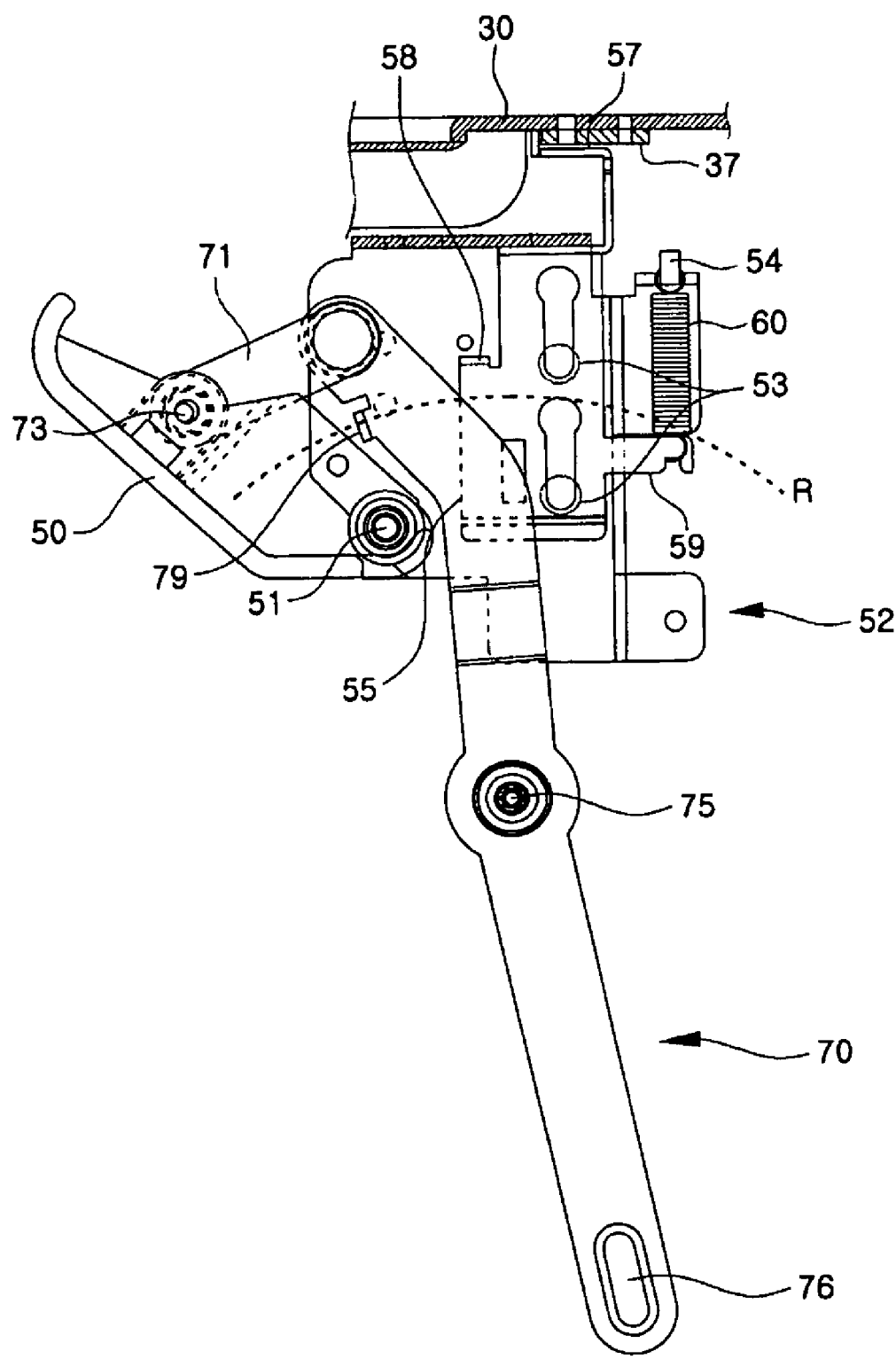
FIG. 6a is a view illustrating the operating state where an operating lever according to the present invention can be operated.
Figure 6B:
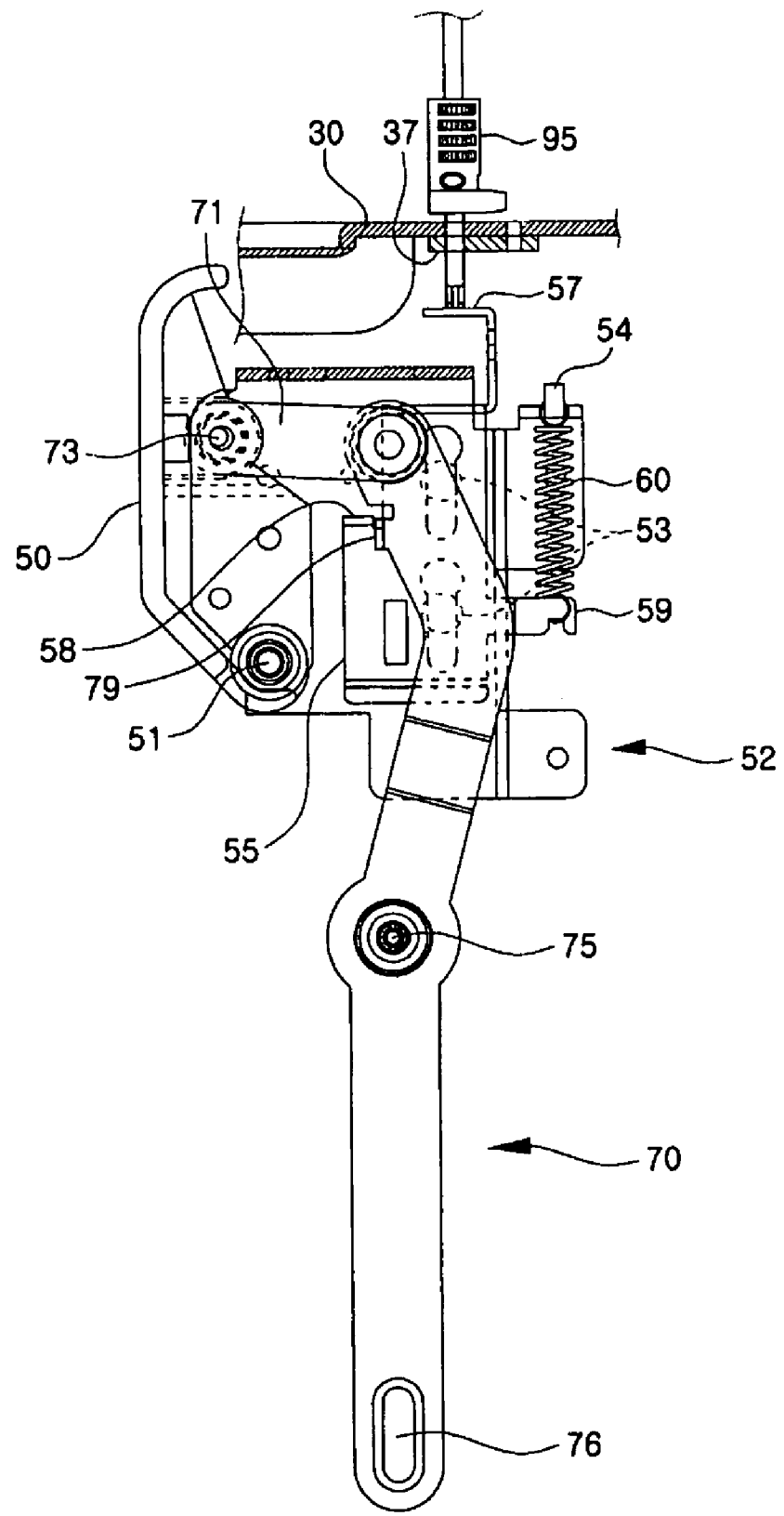
FIG. 6b is a view illustrating the operating state where the operating lever according to the present invention cannot be operated.

With reference to FIGS. 6a and 6b it will now be specifically described how both the port replicator and portable computer are locked.

FIG. 6a shows a state where the locking protrusion 97 is not yet inserted into the second locking hole 33. At this time, the locking plate 55 is moved by means of an elastic force of the elastic member 60, and the driving piece 57 is brought into close contact with a rear surface of the reinforcing piece 37.

Therefore, the hook piece 58 of the locking plate 55 is in a position out of a radius R along which the locking piece 79 of the link mechanism 70 moves. That is, the hook piece 58 is in a position where it is moved relatively toward the connection plate 52c of the lever base 52 relative to the radius R. Since the locking piece 79 and hook piece 58 are positioned in such a manner that they do not interfere with each other, the link mechanism 70 can be freely operated.

FIG. 6a also shows a state where the driving plate 80 is moved due to rotation of the actuating lever 50 about the lever hinge 51. In such a state, the catching hooks 85 and push protrusions 90 are sequentially operated by means of the driving plate 80, and thus, the portable computer can be separated from the port replicator.

FIG. 6b shows a state where the locking protrusion 97 is inserted into the second locking hole 33. If the locking protrusion 97 is inserted into the second hole 33, it pushes the driving piece 57. Then, the locking plate 55 is moved against the elastic force of the elastic member 60. The movement of the locking plate 55 is guided by means of the guide slots 56 and the corresponding guide bosses 53.

If the locking plate 55 is urged against the elastic force due to the insertion of the locking protrusion 97 into the second locking hole 33, the hook piece 58 is placed on the movement radius R of the locking piece 79. Therefore, even though a user wishes to rotate the actuating lever 50 about the lever hinge 51, the link mechanism 70, i.e. the actuating lever 50, cannot be operated because the locking piece 79 contacts the hook piece 58. Accordingly, the port replicator as well as the portable computer mounted thereto are locked by means of the locking mechanism 95 and cannot be easily stolen.

According to the present invention, in order to prevent the actuating lever 50 from moving, the locking piece 79 that contacts the hook piece 58 of the locking plate 55 is provided on the link mechanism 70, but it may be provided on the actuating lever 50.

The antitheft device for the port replicator of the present invention, as described above in detail, has the following advantages.

The portable computer mounted to the port replicator can be kept locked to the port replicator when the port replicator is locked with the locking mechanism. Therefore, both the port replicator and portable computer can be simultaneously locked with a single locking mechanism.

Further, a plurality of locking holes may be formed in such a manner that one of the holes is used to allow only the port replicator to be locked, while another hole is used to allow the portable computer to be locked to the port replicator by inserting the locking mechanism into the relevant hole. Furthermore, since a locking hole is generally provided in the portable computer so as to lock the portable computer using the locking mechanism, the port replicator and portable computer can be locked in various manners using two locking cables, or more preferably using a single locking mechanism according to the present invention.

The scope of the present invention is not limited by the illustrated embodiment but defined by the appended claims. It will be apparent that those skilled in the art can make various modifications and changes within the scope of the invention defined by the claims.

What is claimed is:

1. A port replicator comprising:
    a case for defining an external appearance of said port replicator, said case including a plurality of ports;
    at least one locking feature for accepting a locking mechanism;
    a release accessible from an exterior of said case for receiving an actuating force from a user when the user intends to separate a computer from said port replicator; and
    a locking member for preventing said release from being operated by the user when the locking mechanism is connected to said at least one locking feature, wherein said release is a lever, which is manually pivoted about a hinge connected to said port replicator when the user intends to separate a computer from said port replicator.

2. The port replicator according to claim 1, wherein said at least one locking feature is accessible through a hole formed in said case.

3. The port replicator according to claim 2, wherein said hole is provided in a side of said case.

4. A port replicator comprising:
    a case for defining an external appearance of said port replicator, said case including a plurality of ports;
    at least one locking feature for accepting a locking mechanism;
    a release accessible from an exterior of said case for receiving an actuating force from a user when the user intends to separate a computer from said port replicator; and a locking member for preventing said release from being operated by the user when the locking mechanism is connected to said at least one locking feature, wherein said at least one locking feature is accessible through a hole formed in said case, wherein said at least one locking feature is accessible through a hole formed in said case, further comprising:

a reinforcing piece located within said case, said reinforcing piece having an opening formed therein constituting said at least one locking feature, and wherein said hole in said case provides access to said reinforcing piece within said case such that the locking mechanism can pass through said hole in said case and engage with said opening in said reinforcing piece.

5. The port replicator according to claim 4, wherein said reinforcing piece is formed of metal.

6. The port replicator according to claim 4, wherein said opening in said reinforcing piece is adapted to engage with a KENSINGTON lock.

7. The port replicator according to claim 4, wherein said at least one locking feature includes a first opening and a second opening provided in said reinforcing piece, and wherein said locking member prevents said release from being operated by a user when the locking mechanism is connected to said first opening, and said locking member does not prevent said release from being operated by a user when the locking mechanism is connected to said second opening.

8. The port replicator according to claim 1, further comprising:
at least one computer retaining feature which causes a computer to remain attached to said port replicator until operation of said release; and
a link mechanism connecting said release to said at least one computer retaining feature, wherein said locking member cooperates with said link mechanism to permit or prevent operation of said release depending upon whether or not the locking mechanism is connected to said at least one locking feature.

9. The port replicator according to claim 8, wherein said locking member includes a driving piece adjacent to said at least one locking feature which is engaged and moved by a portion of the locking mechanism, when the locking mechanism is connected to said at least one locking feature.

10. The port replicator according to claim 9, wherein said driving piece is biased toward said at least one locking feature by an elastic member and is moved away from said at least one locking feature by the locking mechanism.

11. The port replicator according to claim 9, wherein said locking member further includes a hook piece connected to said driving piece, and wherein said hook piece blocks movement of said link mechanism when in a first position and permits movement of said link mechanism when in a second position.

12. A port replicator comprising:
a case for defining an external appearance of said port replicator, said case including a plurality of ports;
at least one locking feature for accepting a locking mechanism;
a release accessible from an exterior of said case for receiving an actuating force from a user when the user intends to separate a computer from said port replicator;
a locking member for preventing said release from being operated by the user when the locking mechanism is connected to said at least one locking feature
at least one computer retaining feature which causes a computer to remain attached to said port replicator until operation of said release; and
a link mechanism connecting said release to said at least one computer retaining feature, wherein said locking member cooperates with said link mechanism to permit or prevent operation of said release depending upon whether or not the locking mechanism is connected to said at least one locking feature, wherein said at least one computer retaining feature includes at least one catching hook to fasten a portable computer to said port replicator until deactivated by actuation of said release, and also includes at least one push plate to push a portable computer away from said port replicator upon actuation of said release.

13. A port replicator comprising:
a case for defining an external appearance of said port replicator, said case including a plurality of ports and a hole formed therein;
a reinforcing piece located within said case, said reinforcing piece including at least one locking feature, accessible via said hole in said case, for accepting a locking mechanism;
a release accessible from an exterior of said case for receiving an actuating force from a user when the user intends to separate a computer from said port replicator; and
a locking member for preventing said release from being operated by the user when the locking mechanism is connected to said at least one locking feature.

14. The port replicator according to claim 13, wherein said at least one locking feature is an opening in said reinforcing piece, adapted to engage with a KENSINGTON lock.

15. The port replicator according to claim 13, wherein said release is a lever, which is manually pivoted about a hinge connected to said port replicator when the user intends to separate a computer from said port replicator.

16. The port replicator according to claim 15, further comprising:
at least one computer retaining feature which causes a computer to remain attached to said port replicator until operation of said release; and
a link mechanism connecting said release to said at least one computer retaining feature, wherein said locking member cooperates with said link mechanism to permit or prevent operation of said release depending upon whether or not the locking mechanism is connected to said at least one locking feature, and wherein said locking member includes a driving piece adjacent to said at least one locking feature which is engaged and moved by a portion of the locking mechanism, when the locking mechanism is connected to said at least one locking feature.

17. The port replicator according to claim 16, wherein said at least one computer retaining feature includes at least one catching hook to fasten a portable computer to said port replicator until deactivated by actuation of said release, and also includes at least one push plate to push a portable computer away from said port replicator upon actuation of said release.

18. A method of making a port replicator comprising the steps of:
providing a case for defining an external appearance of the port replicator;
inserting a plurality of ports through a wall of the case;

attaching at least one locking feature for accepting a locking mechanism to the port replicator;

movably attaching a release to the case which is accessible from an exterior of the case for receiving an actuating force from a user when the user intends to separate a computer from the port replicator; and inserting a locking member within the case for preventing the release from being operated by the user when the locking mechanism is connected to the at least one locking feature, wherein the locking member includes a link mechanism, and wherein said step of inserting the locking member within the case includes attaching one end of the link mechanism to the release and attaching another end of the link mechanism to at least one computer retaining feature which causes a computer to remain attached to the port replicator until operation of the release.

* * * * *